United States Patent
Copeland et al.

(10) Patent No.: US 7,458,998 B2
(45) Date of Patent: Dec. 2, 2008

(54) BLENDING BIODIESEL WITH DIESEL FUEL IN COLD LOCATIONS

(75) Inventors: Ken Copeland, Peck, KS (US); Rita Hardy, Wichita, KS (US); Jeff Johnson, Farmington, MN (US); Charles Selvidge, Wichita, KS (US); Kirk Walztoni, Eagan, MN (US)

(73) Assignee: Flint Hills Resources, L.P., Wichita, KS (US)

( * ) Notice: Subject to any disclaimer, the term of this patent is extended or adjusted under 35 U.S.C. 154(b) by 696 days.

(21) Appl. No.: 10/924,239

(22) Filed: Aug. 23, 2004

(65) Prior Publication Data

US 2006/0037237 A1    Feb. 23, 2006

(51) Int. Cl.
    *C10L 1/18* (2006.01)
(52) U.S. Cl. .............................. 44/308; 44/307; 44/388; 44/628
(58) Field of Classification Search ................... 44/307, 44/308, 388, 628
    See application file for complete search history.

(56) References Cited

U.S. PATENT DOCUMENTS

| 5,520,708 | A | 5/1996 | Johnson et al. |
| 5,578,090 | A * | 11/1996 | Bradin ........................ 44/308 |
| 6,174,501 | B1 | 1/2001 | Noureddini |

OTHER PUBLICATIONS

K. Pramanik, Properties and use of jatropha curcas oil and diesel fuel blends in compression ignition engine, Renewable Energy 28 (2003) 239-248.*
Weaver, "Practical Cold Weather Blending & Storage," National Biodiesel Conference & Expo 2004, Feb. 1-4, 2004 Palm Springs, CA.
"Biodiesel & Biodiesel Blends," National Biodiesel Conference & Expo 2004, Feb. 1-4, 2004 Palm Springs, CA.
"Biodiesel Blending Infrastracture," National Biodiesel Conference & Expo 2004, Feb. 1-4, 2004 Palm Springs, CA.

* cited by examiner

*Primary Examiner*—Cephia D Toomer
(74) *Attorney, Agent, or Firm*—Vinson & Elkins LLP

(57) ABSTRACT

Systems and methods for in-line blending of biodiesel and diesel fuels in cold weather environments include diluting heated B100 into a portion of heated diesel prior to blending into a cold diesel stream.

23 Claims, 7 Drawing Sheets

| 47.5 mLs #2 diesel + 2.5 mLs B100 | | | | | Initial Temp °F #2 diesel 0.2°F | | | Initial Temp °F Additive 73°F | | |
|---|---|---|---|---|---|---|---|---|---|---|
| 30 s | 1 m | 2 m | 3 m | 4 m | 5 m | 6 m | 7 m | 8 m | 9 m | 10 m |
| 3.3°F | 2.8°F | 1.5°F | 0.8°F | 0.7°F | 0.4°F | 0.3°F | 0.2°F | 0.2°F | 0.1°F | 0.1°F |

| 47.5 mLs #2 diesel + 2.5 mLs B100 | | | | | Initial Temp °F #2 diesel 11.1°F | | | Initial Temp °F Additive 68.5°F | | |
|---|---|---|---|---|---|---|---|---|---|---|
| 30 s | 1 m | 2 m | 3 m | 4 m | 5 m | 6 m | 7 m | 8 m | 9 m | 10 m |
| 12.6°F | 12.9°F | 12.4°F | 12°F | 11.8°F | 11.7°F | 11.6°F | 11.5°F | 11.4°F | 11.3°F | 11.3°F |

| 47.5 mLs #2 diesel + 2.5 mLs B100 | | | | | Initial Temp °F #2 diesel 21.0°F | | | Initial Temp °F Additive 68.6°F | | |
|---|---|---|---|---|---|---|---|---|---|---|
| 30 s | 1 m | 2 m | 3 m | 4 m | 5 m | 6 m | 7 m | 8 m | 9 m | 10 m |
| 23.3°F | 22.4°F | 21.8°F | 21.4°F | 21.1°F | 21°F | 20.9°F | 20.8°F | 20.9°F | 20.8°F | 20.9°F |

FIG. 1a

| 47.5 mLs #2 diesel + 2.5 mLs B100 | | | | | Initial Temp °F #2 diesel 0.2°F | | | Initial Temp °F Additive 73°F | | |
|---|---|---|---|---|---|---|---|---|---|---|
| 30 s | 1 m | 2 m | 3 m | 4 m | 5 m | 6 m | 7 m | 8 m | 9 m | 10 m |
| 3.3°F | 2.8°F | 1.5°F | 0.8°F | 0.7°F | 0.4°F | 0.3°F | 0.2°F | 0.2°F | 0.1°F | 0.1°F |

| 47.5 mLs #2 diesel + 2.5 mLs B100 | | | | | Initial Temp °F #2 diesel 11.1°F | | | Initial Temp °F Additive 68.5°F | | |
|---|---|---|---|---|---|---|---|---|---|---|
| 30 s | 1 m | 2 m | 3 m | 4 m | 5 m | 6 m | 7 m | 8 m | 9 m | 10 m |
| 12.6°F | 12.9°F | 12.4°F | 12°F | 11.8°F | 11.7°F | 11.6°F | 11.5°F | 11.4°F | 11.3°F | 11.3°F |

| 47.5 mLs #2 diesel + 2.5 mLs B100 | | | | | Initial Temp °F #2 diesel 21.0°F | | | Initial Temp °F Additive 68.6°F | | |
|---|---|---|---|---|---|---|---|---|---|---|
| 30 s | 1 m | 2 m | 3 m | 4 m | 5 m | 6 m | 7 m | 8 m | 9 m | 10 m |
| 23.3°F | 22.4°F | 21.8°F | 21.4°F | 21.1°F | 21°F | 20.9°F | 20.8°F | 20.9°F | 20.8°F | 20.9°F |

FIG. 1b

| 46.6 mLs #2 diesel + 3.4 mLs 75/25 B100/#2 diesel | | | | | Initial Temp °F #2 diesel 1.0°F | | | | Initial Temp °F Additive 73°F | | |
|---|---|---|---|---|---|---|---|---|---|---|---|
| 30 s | 1 m | 2 m | 3 m | 4 m | 5 m | 6 m | 7 m | 8 m | 9 m | 10 m |
| 5.9°F | 4.8°F | 3.5°F | 2.6°F | 2.1°F | 1.8°F | 1.7°F | 1.6°F | 1.5°F | 1.4°F | 1.3°F |

| 45.0 mLs #2 diesel + 5.0 mLs 50/50 B100/#2 diesel | | | | | Initial Temp °F #2diesel 1.1°F | | | | Initial Temp °F Additive 73°F | | |
|---|---|---|---|---|---|---|---|---|---|---|---|
| 30 s | 1 m | 2 m | 3 m | 4 m | 5 m | 6 m | 7 m | 8 m | 9 m | 10 m |
| 6.5°F | 5.5°F | 4.0°F | 2.4°F | 1.8°F | 1.3°F | 1.0°F | 0.7°F | 0.7°F | 0.5°F | 0.5°F |

| 45.0 mLs #2 diesel + 5.0 mLs 50/50 B100/#2 diesel | | | | | Initial Temp °F #2diesel 0.3°F | | | | Initial Temp °F Additive 50°F | | |
|---|---|---|---|---|---|---|---|---|---|---|---|
| 30 s | 1 m | 2 m | 3 m | 4 m | 5 m | 6 m | 7 m | 8 m | 9 m | 10 m |
| 6.1°F | 5.0°F | 3.1°F | 2.2°F | 1.4°F | 1.0°F | 0.8°F | 0.7°F | 0.6°F | 0.6°F | 0.6°F |

| 45.0 mLs #2 diesel + 5.0 mLs 50/50 B100/#2 diesel | | | | | Initial Temp °F #2diesel 1.1°F | | | | Initial Temp °F Additive 40°F | | |
|---|---|---|---|---|---|---|---|---|---|---|---|
| 30 s | 1 m | 2 m | 3 m | 4 m | 5 m | 6 m | 7 m | 8 m | 9 m | 10 m |
| 5.9°F | 4.9°F | 3.5°F | 2.7°F | 2.3°F | 1.8°F | 1.6°F | 1.5°F | 1.4°F | 1.4°F | 1.4°F |

FIG. 1c

| 40.0 mLs #2 diesel + 10.0 mLs 25/75 B100/#2 diesel | | | | | Initial Temp °F #2diesel 1.0°F | | | Initial Temp °F Additive 73°F | | |
|---|---|---|---|---|---|---|---|---|---|---|
| 30 s | 1 m | 2 m | 3 m | 4 m | 5 m | 6 m | 7 m | 8 m | 9 m | 10 m |
| 12.9°F | 9.7°F | 5.4°F | 3.7°F | 2.7°F | 1.9°F | 1.5°F | 1.2°F | 1.1°F | 1.0°F | 0.9°F |

| 47.5 mLs #2 diesel + 2.5 mLs B100 | | | | | Initial Temp °F #2diesel 0.2°F | | | Initial Temp °F Additive 73°F | | |
|---|---|---|---|---|---|---|---|---|---|---|
| 30 s | 1 m | 2 m | 3 m | 4 m | 5 m | 6 m | 7 m | 8 m | 9 m | 10 m |
| 3.3°F | 2.8°F | 1.5°F | 0.8°F | 0.7°F | 0.4°F | 0.3°F | 0.2°F | 0.2°F | 0.1°F | 0.1°F |

| 46.6 mLs #2 diesel + 3.4 mLs 75/25 B100/#1 diesel | | | | | Initial Temp °F #2diesel 0.5°F | | | Initial Temp °F Additive 73°F | | |
|---|---|---|---|---|---|---|---|---|---|---|
| 30 s | 1 m | 2 m | 3 m | 4 m | 5 m | 6 m | 7 m | 8 m | 9 m | 10 m |
| 5.3°F | 4.0°F | 3.1°F | 2.4°F | 2.0°F | 1.9°F | 1.7°F | 1.6°F | 1.5°F | 1.5°F | 1.5°F |

| 45.0 mLs #2 diesel + 5.0 mLs 50/50 B100/#1 diesel | | | | | Initial Temp °F #2diesel 0.5°F | | | Initial Temp °F Additive 73°F | | |
|---|---|---|---|---|---|---|---|---|---|---|
| 30 s | 1 m | 2 m | 3 m | 4 m | 5 m | 6 m | 7 m | 8 m | 9 m | 10 m |
| 7.0°F | 6.8°F | 5.0°F | 3.8°F | 3.2°F | 2.7°F | 2.6°F | 2.4°F | 2.3°F | 2.2°F | 2.2°F |

FIG. 1d

| 45.0 mLs #2 diesel + 5.0 mLs 50/50 B100/#1 diesel | | | | | Initial Temp °F #2diesel 0.4°F | | | Initial Temp °F Additive 50°F | | |
|---|---|---|---|---|---|---|---|---|---|---|
| 30 s | 1 m | 2 m | 3 m | 4 m | 5 m | 6 m | 7 m | 8 m | 9 m | 10 m |
| 6.1°F | 5.0°F | 3.6°F | 2.6°F | 2.0°F | 1.6°F | 1.4°F | 1.4°F | 1.3°F | 1.2°F | 1.2°F |

| 45.0 mLs #2 diesel + 5.0 mLs 50/50 B100/#1 diesel | | | | | Initial Temp °F #2diesel 1.0°F | | | Initial Temp °F Additive 40°F | | |
|---|---|---|---|---|---|---|---|---|---|---|
| 30 s | 1 m | 2 m | 3 m | 4 m | 5 m | 6 m | 7 m | 8 m | 9 m | 10 m |
| 6.0°F | 5.3°F | 3.6°F | 2.4°F | 1.9°F | 1.6°F | 1.3°F | 1.1°F | 1.1°F | 1.1°F | 1.0°F |

| 40.0 mLs #2 diesel + 10.0 mLs 25/75 | | | | | Initial Temp °F #2diesel 0.7°F | | | Initial Temp °F Additive 73°F | | |
|---|---|---|---|---|---|---|---|---|---|---|
| 30 s | 1 m | 2 m | 3 m | 4 m | 5 m | 6 m | 7 m | 8 m | 9 m | 10 m |
| 12.9°F | 10.6°F | 6.9°F | 4.2°F | 3.5°F | 2.7°F | 2.3°F | 2.0°F | 1.8°F | 1.7°F | 1.7°F |

| 47.5 mLs #2 diesel + 2.5 mLs B100 | | | | | Initial Temp °F #2diesel 0.2°F | | | Initial Temp °F Additive 73°F | | |
|---|---|---|---|---|---|---|---|---|---|---|
| 30 s | 1 m | 2 m | 3 m | 4 m | 5 m | 6 m | 7 m | 8 m | 9 m | 10 m |
| 3.3°F | 2.8°F | 1.5°F | 0.8°F | 0.7°F | 0.4°F | 0.3°F | 0.2°F | 0.2°F | 0.1°F | 0.1°F |

FIG. 1e

| 45.0 mLs #2 diesel + 5.0 mLs 50/50 B100/Artic | | | | | Initial Temp °F #2diesel 1.1°F | | | | | Initial Temp °F Additive 40°F | | |
|---|---|---|---|---|---|---|---|---|---|---|---|---|
| 30 s | 1 m | 2 m | 3 m | 4 m | 5 m | 6 m | 7 m | 8 m | 9 m | 10 m |
| 4.1°F | 5.6°F | 3.9°F | 2.8°F | 2.2°F | 1.7°F | 1.5°F | 1.3°F | 1.2°F | 1.1°F | 1°F |

| 47.5 mLs #1 diesel + 2.5 mLs B100 | | | | | Initial Temp °F #2diesel 0.5°F | | | | | Initial Temp °F Additive 68.4°F | | |
|---|---|---|---|---|---|---|---|---|---|---|---|---|
| 30 s | 1 m | 2 m | 3 m | 4 m | 5 m | 6 m | 7 m | 8 m | 9 m | 10 m |
| 3.4°F | 2.3°F | 1.4°F | 0.9°F | 0.7°F | 0.5°F | 0.4°F | 0.3°F | 0.4°F | 0.4°F | 0.4°F |

| 47.5 mLs #1 diesel + 2.5 mLs B100 | | | | | Initial Temp °F #2diesel 20.4°F | | | | | Initial Temp °F Additive 67°F | | |
|---|---|---|---|---|---|---|---|---|---|---|---|---|
| 30 s | 1 m | 2 m | 3 m | 4 m | 5 m | 6 m | 7 m | 8 m | 9 m | 10 m |
| 22.8°F | 21.8°F | 21.1°F | 20.8°F | 20.7°F | 20.6°F | 20.6°F | 20.6°F | 20.6°F | 20.6°F | 20.6°F |

Temperatures listed in bold indicate that NO WAX WAS OBSERVED.

BLENDING BIODIESEL WITH DIESEL FUEL IN COLD LOCATIONS

BACKGROUND OF THE INVENTION

Biodiesel (mono alkyl esters) is a cleaner-burning diesel fuel made from natural, renewable sources such as vegetable oils. The practice of blending biodiesel into diesel fuel has been studied and practiced commercially for several years. Such blending operations have been widespread in "warm" periods defined as those occasions where the diesel fuel is not lower in temperature than the biodiesel Cloud Point or Pour Point. However there is limited experience with blending of biodiesel with diesel fuel that is below the biodiesel Cloud Point or Pour Point.

Diesel fuels are characterized, in part, by their relatively large carbon number. One result of the large carbon number is that the fuels are sensitive to low temperatures where some of the component compounds can begin to crystallize. The presence of solid crystals in the fuel affects the viscosity, volatility and the passage of the fuel through fuel filters. There are various measures applied to describe the crystallization tendency of a diesel fuel. The most common are pour point (ASTM D-97), Cloud Point (ASTM D-2500, ASTM D 5771, ASTM D 5773) cold filter plugging point ([P-309), and the low-temperature flow test (ASTM D-4539). All of these tests have the common goal of describing fuel plugging and/or crystallization at low temperatures.

Reported cases of blending biodiesel with diesel fuel in cold climates have involved adding "very hot biodiesel" to diesel fuel in splash blends. Some examples of this type operation were reported at the National Biodiesel Conference in February, 2004. For example, presenters from the Defense Energy Support Center stated that the optimum blending technique was that diesel fuel is picked up at a supplier loading rack and driven to a B100 supplier. The warm/hot B100 is added to the diesel fuel and blending occurs during transportation to the customer. The presenters also stated, however, that quality concerns arise because "improper blending during colder months can result in cloudiness, gelling, particulate formation or filter clogging." Their only solution was that, due to colder climates, some areas of the country do not supply biodiesel in the winter, although heated tanks or tanks inside heated buildings are being added.

These examples represented "trial" programs and involved relatively small volumes of diesel fuel. In every reported example, B100 was diluted into diesel fuel. The present inventors are not aware of any current practice of in line blending of biodiesel into diesel fuel at a bulk fuel terminal in the north in the winter when diesel fuel can be below the biodiesel Cloud Point.

Addition of soy or other fatty acid based biodiesels as B100 to diesel fuel that is below 20° F. typically yields a separate phase that persists for "minutes" even when the cold diesel is subjected to significant mixing. This suggests that delivery of bright and clear product will be problematic at winter conditions where diesel fuel is below, to substantially below 20° F., which occurs regularly at cold weather terminals in Europe and in the United States, such as terminals at Pine Bend, Minn. and other terminals supplying the Minnesota market. The inventors are not aware of any known designs proven for in line blending of biodiesel fuels for delivery in "Minnesota cold" temperatures. This is of particular importance since the Minnesota 2% Biodiesel mandate became law on Mar. 15, 2002. This law is expected to require that all of the diesel fuel sold in the state contain at least 2 percent biodiesel after Jun. 30, 2005.

SUMMARY

The present disclosure may be described, in certain embodiments, as a method of providing a blend of biodiesel and diesel fuel in a cold temperature environment comprising blending a portion of diesel fuel with 100% biodiesel to achieve a first blend of biodiesel and diesel fuel, wherein the diesel and biodiesel are heated to a temperature such that the temperature of the first blend is above the Cloud Point for the first blend, and adding the first blend to unheated diesel fuel to provide a second biodiesel blend for delivery into a tank truck, for example. The disclosure is based on the surprising discovery that blending a BXX that is less than B100 into a cold diesel stream to achieve a final blend of B5 or B2 for example, can be done at a lower temperature without formation of precipitates, than direct blending of 5% or 2% B100 into the cold diesel stream.

In certain embodiments, therefore, a first or preliminary blend is produced that is less than B100, such as B75, B50, B25, or even B10. The concentration of the preliminary blend may vary depending on the conditions, including the temperature of the cold diesel stream, on the cost efficiencies of heating a portion of the cold diesel, the Cloud Point and temperature of the first blend, and on the concentration of the final blend to be produced. It is an aspect of the disclosure, however, for purposes of energy conservation and cost savings, that a minimum effective amount of cold diesel should be heated to mix with heated B100 in order to produce the preliminary blend.

It is an aspect of the disclosure that the B100 biodiesel to be blended with diesel fuel is maintained in a heated environment, either in a heated tank or in a tank located within a heated room. However this is accomplished, it is preferred in certain embodiments that the biodiesel be held at a selected constant temperature so the temperature of the preliminary blend can be controlled by an in-line heater that heats the portion of diesel fuel blended into the first blend. The inline heater, as well as the heater for the B100 tank may be of any appropriate type including an electric or natural gas burning heater, a catalytic or chemical heater, a heat exchanger or any other appropriate heater known in the art. In certain embodiments, the in-line heater is a heat exchanger configured to in which the heated B100 heats the cold diesel. The biodiesel, B100, is therefore preferably held in a heated tank prior to mixing with the heated diesel, and preferably the heated tank is at a constant temperature of from 5° F. to 120° F., from 10° F. to 120° F., from 30° F. to 100° F., or from 40° F. to 70° F., inclusive. The minimum tank temperature depends on the Cloud Point and Pour Point of the B100 and cannot be lower than these values for satisfactory operation.

It is a further aspect of the disclosure that the portion of diesel fuel added to the first blend is diverted from an unheated diesel stream into a conduit or pipe that includes an in-line heater prior to mixing with the 100% biodiesel (B100). The temperature of the heated diesel is preferably controlled in order to maintain the first or preliminary blend above the Cloud Point of that blend and "clear and bright" or free of precipitates, and to produce a second or final blend with a temperature above the Cloud Point of that final blend and "clear and bright" or free of precipitates, where the final blend may be moved or pumped through a conduit or pipe to a load arm for loading into a tank truck. In preferred embodiments, therefore, the heated portion of diesel may be heated to a temperature of from 5° F. to 120° F., from 10° F. to 120° F., from 30° F. to 100° F., or from 40° F. to 70° F., inclusive.

The present disclosure may also be described in certain aspects as an in-line method of producing a bright and clear blend of biodiesel in which biodiesel is blended into diesel fuel that is below 20° F. The disclosed method includes providing a heated tank of 100% biodiesel and an unheated tank of diesel fuel; moving or pumping heated biodiesel through a first conduit from the heated tank to a first injection point; moving unheated diesel fuel through a second conduit to a second injection point; diverting a portion of the diesel fuel into a third conduit prior to the second injection point, wherein the third conduit comprises an in-line heater, wherein the third conduit joins the first conduit at the first injection point, and wherein a first blend is produced at the first injection point, and further wherein the first blend is at a temperature above the Cloud Point of the first blend; and moving the first blend through the first conduit to the second injection point such that the first blend is blended with the unheated diesel fuel to produce a bright and clear biodiesel blend. In preferred embodiments of the method, the first blend is from 5% to 90% biodiesel, from 20% to 80% biodiesel, from 25% to 75% biodiesel, or from 5% to 50% biodiesel.

Certain aspects of the disclosure may also be described as a rack system for blending and loading biodiesel into tank trucks in a cold environment. The system includes a heated tank for holding biodiesel; a first injection point; a second injection point; a first conduit or pipe providing a fluid connection from the heated tank to the first injection point and including a valve for controlling flow of liquid from the heated tank through the conduit; a second conduit or pipe providing a fluid connection from a source of unheated diesel fuel to the second injection point; a third conduit or pipe in fluid connection to the second conduit between the source of unheated diesel fuel and the second injection point, connecting the second conduit to the first injection point, and wherein the third conduit includes an in-line heater; a fourth conduit or pipe fluidly connecting the first injection point and the second injection point; a fifth conduit or pipe fluidly connecting the second injection point with a load arm for loading a biodiesel blend into a tank truck; one or more pumps for moving the fuels and mixtures through the conduits, and an automated control system configured to control the concentrations of biodiesel in the blends at the first and second injection points and the temperature of the heated diesel fuel in the third conduit prior to entering the first injection point. In preferred embodiments the automated control system monitors the temperature of the biodiesel entering the first injection point, the temperature of the heated diesel fuel entering the first injection point, the temperature of the biodiesel blend entering the second injection point and the temperature of the unheated diesel fuel entering the second injection point. The rack system may further include a first meter in the first conduit for controlling flow of biodiesel from the heated tank, and a second meter in the fifth conduit for controlling blend of biodiesel at the second injection point. It is understood that the fluids are actively pumped through the conduits of the described systems by any configuration of one or more pumps known in the art.

In the practice of the disclosure, the injections points are any type of fluid junction known in the art such as T-type connections, Y-connections, venturis, or any other appropriate design for combining or mixing two fluid streams that benefit from thorough mixing.

As used herein, "biodiesel" is intended to convey its ordinary meaning to those in the art and may be defined as monoalkyl esters of long chain fatty acids derived from vegetable oils or animal fats.

"Biodiesel blends" are blends of biodiesel fuel with petroleum based diesel fuel. In the designation BXX, the number or numbers after the B indicate the percentage of biodiesel in the blend, the remainder of which is diesel fuel such as low sulfur number 1-D or 2-D.

For example, B2 contains 2% biodiesel and 98% diesel fuel. B25 contains 25% biodiesel and 75% diesel fuel, and B100 is 100% biodiesel. Diesel fuel is defined as a middle distillate fuel designed (per ASTM D 975) for diesel engines. It is understood that, throughout the present disclosure, the percentage of biodiesel indicated in the formula BXX is approximate within the range of blending error that occurs with commercial scale blending of fuels and may vary by ±2% or more preferably by ±1%.

"Cloud Point" is defined as that temperature of a liquid specimen when a wax crystal structure that is similar in appearance to a cloud is formed upon cooling under prescribed conditions. Cold Filter Plugging Point (CFPP) is defined as the highest temperature, expressed in multiples of 1° C., at which a given volume of fuel fails to pass through a standardized filtration device in a specified time when cooled under prescribed conditions.

Throughout this disclosure, unless the context dictates otherwise, the word "comprise" or variations such as "comprises" or "comprising," is understood to mean "includes, but is not limited to" such that other elements that are not explicitly mentioned may also be included. Further, unless the context dictates otherwise, use of the term "a" may mean a singular object or element, or it may mean a plurality, or one or more of such objects or elements.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 1 is a table containing data from the study described in Example 1, in which warm biodiesel blends were added to cold diesel.

DETAILED DESCRIPTION

The present disclosure is based on the inventor's surprising discovery that blending biodiesel fuels by adding B50 or lower concentration biodiesel to cold agitated diesel fuel as low as 0-5° F. yields bright and clear product quickly and such design conditions are expected to provide clear and bright product at delivery for most winter conditions. A further aspect of the present disclosure is a "slip stream BXX" flow scheme that provides a novel design basis for terminal addition of biodiesel, particularly in cold weather conditions.

An important aspect of the present disclosure is blending biodiesel with cold diesel fuel by first changing the biodiesel blend composition from B100 to a lower concentration of biodiesel such as B75, B50, B25, or B10, for example (with the corresponding diesel fuel being the second blend component) prior to mixing with cold diesel to avoid the potentially problematic behavior of the addition of fluid B100 to cold diesel fuel. As shown in FIG. 1, all of the diluted blends performed better than the B100 in terms of decreasing the time for existence of a separate phase. The B50 and lower biodiesel concentrations essentially eliminated the presence of separate phases on addition of heated biodiesel to cold diesel and quickly produced only visibly bright and clear product. Such test data give a high degree of confidence that in-line addition of such B50 or lower biodiesel blends at the truck rack into the "cold diesel" (so long as the cold diesel is above the BX Cloud Point) flowing to a delivery tanker will still give sufficient mixing and residence time so that the fuel that enters the tanker is bright and clear. Therefore the delivery is not subject to the uncertainty in performance that occurs when particulates enter a tank truck. This is important for winter operation especially considering that the tank truck can be the coldest part of the distribution system. A major improvement provided by this disclosure of biodiesel blend component design is shown clearly by comparing the data for B100 addition versus B50 and less addition. The B50 and lower concentrations eliminate the formations of an "undissolved" separate phase that occurs in many cases for the B100 at essentially the same mix temperatures. This discovery thus provides a substantial improvement over the state of the art.

Another aspect of the present disclosure are novel designs for a terminal system for injection of biodiesel into cold diesel fuel. These designs include storage of biodiesel as B100 in a heated tank with temperature of at least 40° F. but preferably warmer, such as 75° F. or higher in which the heated B100 is mixed with heated diesel to form a blend of less than B100, which is then mixed with cold diesel. An aspect of this disclosure is a novel method for producing a BX blend component that avoids the expense and complexity of a BX blend tank. The flow scheme for a preferred embodiment is shown in FIG. 2.

Figure 2:
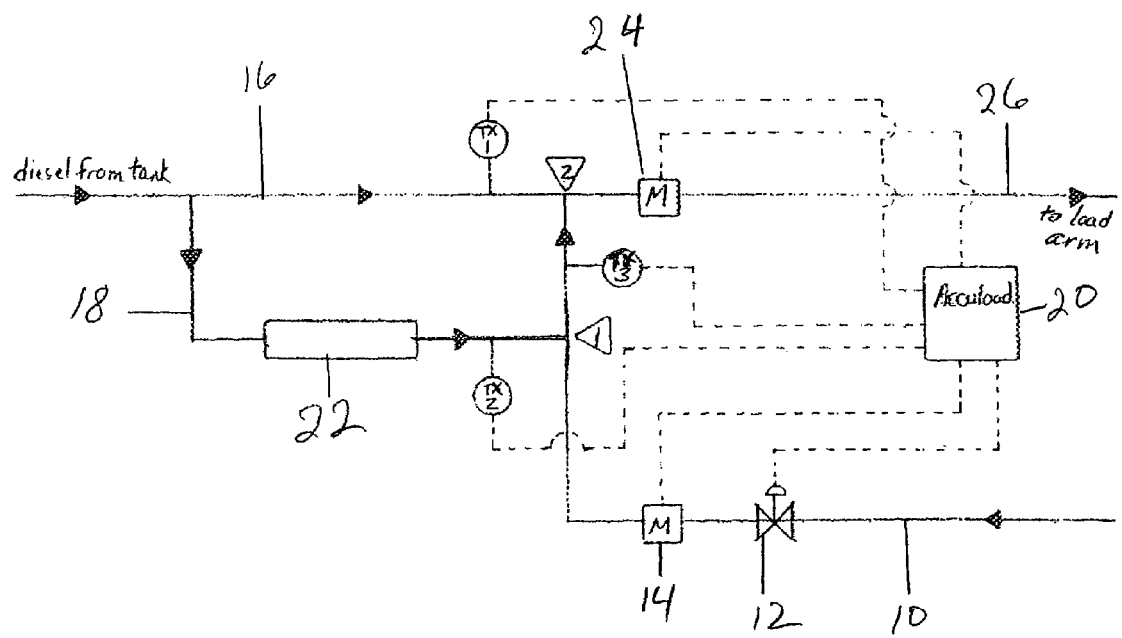
FIG. 2 is a diagram of a preferred embodiment of an in-line blending system for the cold weather delivery of biodiesel/diesel blends.
Figure 3:
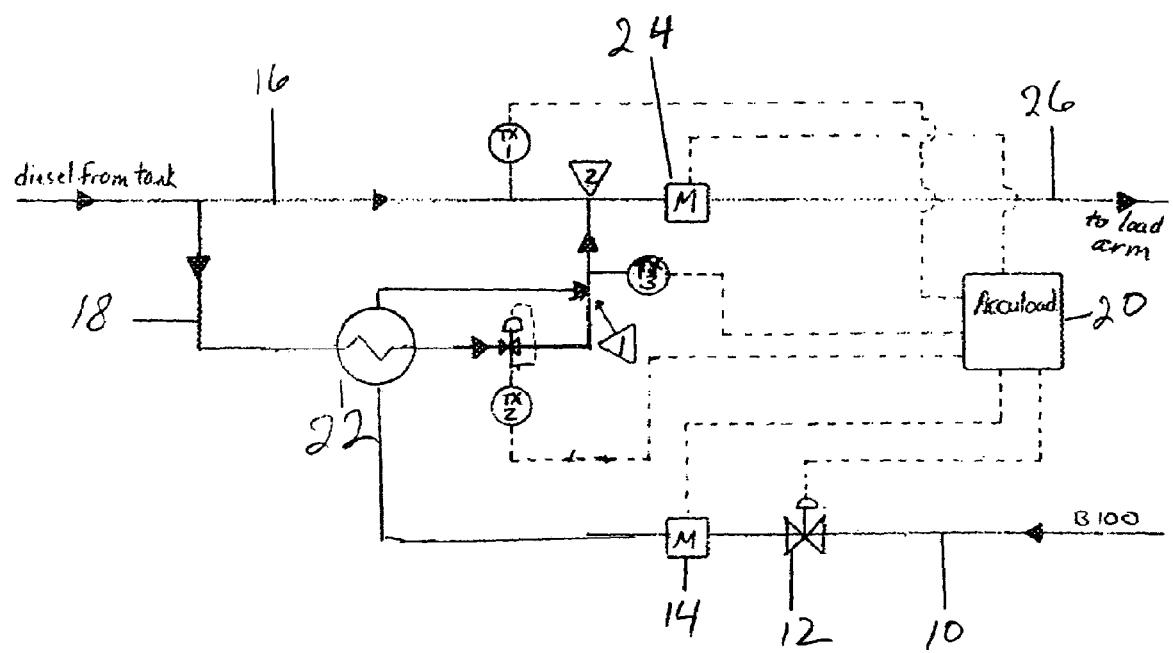
FIG. 3 is a diagram of a preferred embodiment of an in-line blending system for the cold weather delivery of biodiesel/diesel blends.

In the embodiment shown in FIG. 2, blending of the biodiesel mix is controlled by a programmable load controller 20 such as a commercially available Accuload III load controller. B100 (100% biodiesel) is stored in a heated tank at a constant temperature, such as 75° F., for example. It is understood that heat may be applied directly to the tank and/or its contents, or the tank may be simply located in a heated building or enclosure. Heated B100 enters the blending system through conduit 10, controlled and monitored by valve 12 and meter 14. Unheated diesel enters the blending system from a diesel storage tank through conduit 16. A portion of the diesel fuel is diverted through conduit 18 to heater 22. The heater may be any type of heater such as an electric heater, and is more preferably a heat exchanger that heats the cold diesel by heat exchange with the hot biodiesel as shown in FIG. 3. The B100 and heated diesel are mixed at injection point 1. This preliminary blend is then mixed with diesel in conduit 16 at injection point 2 to achieve the final concentration (BX), the flow of which is monitored by meter 24 and transported to the load arm through conduit 26. The system controller also monitors the temperature at three points in the system, shown as TX1, TX2 and TX3.

During operation, the loading system manages injection points 1 and 2 in order to achieve the correct blend without formation of a separate phase or of particles. Successful blending depends, in part, on four temperatures, (i) the temperature of B100 at injection point 1, (ii) temperature of the diesel entering point 1 for mixing with the B100, (iii) temperature of the BXX blend entering injection point 2, and (iv) temperature of the diesel entering injection point 2. The system further controls the concentration of BXX entering the stream at injection point 2 in order to achieve the correct final blend.

In certain embodiments, the B100 biodiesel and a portion of the diesel are heated independently to a temperature of from about 5° F. to about 120° F., from about 10° F. to about 120° F., from about 30° F. to about 100° F., or from about 40° F. to about 70° F. It is understood that the diesel and the biodiesel are not necessarily heated to the same temperature although they may be in certain embodiments. It is preferred that the biodiesel tank is heated to a constant temperature such as 70° F., for example and that the diesel is heated to a temperature that may vary, depending on the temperature of the cold diesel stream (or the temperature of the diesel storage tank). By controlling the temperature of the biodiesel and diesel, and further by controlling the concentration of the preliminary mixture, the system allows the preliminary mixture to remain at a temperature above the Cloud Point of that particular mixture.

Using the values from Table 1, for example, a mixture of 50% #2diesel and 50% B100 (B50) would preferably be held above a temperature of 13.3° F., the Cloud Point of B50 in #2diesel. A mixture of 25% B100 and 75% #2diesel would preferably be held above 2.8° F., the Cloud Point of B25 in #2diesel. It is also understood that the temperature of the mixture produced at injection point 1 should be high enough that, when added to the cold diesel stream at injection point 2, the final mixture should be a temperature above the Cloud Point of the final mixture.

The initial mixture at injection point 1 may be any desired formulation, but is preferably no more than 75% biodiesel, and more preferably 25-50% biodiesel. The preliminary B50 mixture would then be added to the cold diesel stream to produce a final blend of B5 or B2 for example, as needed. The disclosed system offers the advantage that only a small portion of the diesel needs to be heated in an in-line heater, thus saving energy cost and expense of providing a heated diesel tank. The data disclosed herein confirm that B50 blended into relatively cold diesel (0-5° F.) avoids significant formation of separate biodiesel rich phase material.

These tests indicate that B100 can be successfully blended into cold diesel that is at least 20° F. without formation of observable separate phase. Conservatism in design suggests designing the slip stream diesel fuel heaters for a diesel fuel temperature of about 30-50° F. for the blending of B2. These tests support system designs where mixing the B50 or lower BX type blends with cold diesel is effective for cases where the diesel fuel is at least 0-5° F.

The much lower Cloud Point of No. 1 LS suggests that it would avoid problems when producing B2 even at the extremes of terminal fuel temperatures that have been observed when practicing the present disclosure. It is interesting to note the surprising effect of biodiesel upon the Cloud Point of No. 1 LS. Cloud Point elevation by adding biodiesel to No. 1 LS is extreme and strongly non linear. This is shown by the data in Table 2. Other literature studies confirm the large Cloud Point elevation in No. 1 LS caused by biodiesel. This apparent degradation of the Cloud Point benefits of No. 1 diesel may not be a major problem for relatively low biodiesel concentrations such as B2. However it raises questions about the ability to provide economically viable fuel options for very low temperature performance at higher biodiesel blend levels. The methods of the present disclosure are expected to address this potential problem as well.

EXAMPLE 1

Blending Biodiesel with Diesel Fuel in Cold Locations

Visual laboratory tests have been reported for blending of biodiesel into quiescent "cold diesel." When heated biodiesel is dripped into static cold diesel (less than 20° F.) a separate phase forms from a substantial part of the biodiesel. This phase appears to be "solid" biodiesel particles of rather smooth granular appearance. Initially these particles tend to "float" on the cold biodiesel. As they cool and their density increases they tend to stream down in the flask containing the cold diesel fuel. However their distinct granular appearance persists and significant amounts of this separate phase report to the bottom of the laboratory container. This separate phase exists even at temperatures higher than the Cloud Point of the equilibrium blend of the cold diesel fuel and added biodiesel. Presumably with sufficient time and mixing the separate phase would disappear and a clear and bright solution remain, the separate phase eventually "dissolving" into the cold diesel fuel (as long as it is not so cold as to be below the BX Cloud Point, where X is the equilibrium concentration of added biodiesel.) Octel Starreon, LLC reported results similar to this at the National Biodiesel Conference: February, 2004.

A series of tests was conducted that provided a higher level of simulation than the quiescent tests described above. In these tests the conditions that would be encountered by in line blending of biodiesel at a fuels terminal were more closely simulated. (Essentially an in line blender injects hot biodiesel into a flowing and thereby "mixed" stream of cold diesel.) This condition was simulated by agitating the cold diesel into which the biodiesel was injected.

The scope of the study was to study the effects of adding warm biodiesel blends to cold #2 diesel and #1 diesel. The fuel used were:

AG Biodiesel (Soy diesel 99000 AG-4. 20020607-05)

2 diesel (Received Mar. 17, 2004)

1 diesel (Jet A 03086533)

The following test conditions were used.

2 diesel was held at a temperature of test 0.4 to 1.1° F.

Biodiesel blends temp @ room temp (73° F.), 50° F., 40° F.

Constant stirring set at 2

Description of Test: 40 to 50 mLs of #2 diesel was charged in a jacketed graduated receiver.

A temperature probe was inserted in the middle of the #2 diesel.

Coolant was circulated through the jacket to cool the #2 diesel.

The stirrer was started.

When the temperature of the fuel was stable the initial temperature was recorded.

Enough warm biodiesel blend was added below the surface of the #2 diesel just above the stir bar to make a B5 mixture.

The B5 temperature and condition (wax crystal formation) was observed and recorded after 30 seconds then every minute for 10 minutes The recorded data are shown in FIG. 1.

As shown in FIG. 1, in those blends in which B100 is added to diesel resulting in a blend at temperatures below 20° F., waxes were observed upon mixing, and persisted for minutes in the blend. In contrast, blends in which a heated biodiesel/diesel blend was added to cold diesel, no wax was observed, even when the cold diesel was at temperatures of below 5° F., and even below 1° F., thus demonstrating the ability to blend biodiesel even at "Minnesota cold" temperatures.

Cloud Points of the various blends are shown in Tables 1 and 2.

TABLE 1

| Blend Composition | ASTM D5773 ° F. |
|---|---|
| 75/25 B100/#2 diesel | 21.4 |
| 50/50 B100/#2 diesel | 13.3 |
| 25/75 B100/#2 diesel | 2.8 |
| 75/25 B100/#1 diesel | 19.0 |
| 50/50 B100/#1 diesel | 12.6 |
| 25/75 B100/#1 diesel | -2.2 |
| #2 diesel | -2.6 |
| #1 diesel | -68.0 |
| AG Biodiesel | 29.4 |

TABLE 2

| Percent Biodiesel | No. 2 LS | No. 1 LS |
|---|---|---|
| 100 | 29.4 | 29.4 |
| 75 | 21.4 | 19 |
| 50 | 13.3 | 12.6 |
| 25 | 2.8 | -2.2 |
| 0 | -2.6 | -68 |

The surprising results of these studies are extremely informative; and they give a basis for a novel design for addition of biodiesel to cold diesel fuel. "Cold diesel fuel" with varying degrees of coldness can be expected at a Minnesota fuels terminal during winter, as well as in other cold temperature locations such as northern Europe, Canada, or Alaska, for example. Important variables in this test program included the following:

Temperature of the "cold diesel"

Temperature of the heated biodiesel

Composition and temperature of the biodiesel blend component

Time after addition of biodiesel blend component

A key performance factor in these studies was the point at which the cold diesel fuel blend with the added biodiesel blend component became "bright and clear" and absent any separate phase. The "bright and clear" region is indicated by the bold numbers in FIG. 1.

The simplest result and the result that could have been expected before this present disclosure would be that the added biodiesel component would "disappear" within the cold diesel "quickly" after addition to the "mixed" cold diesel as long as the cold diesel was above the BX Cloud Point. For the studies shown an amount of biodiesel was added to yield a B5 blend. In every case the test temperatures were above the B5 Cloud Point for the diesel fuels used. Therefore the equilibrium state should be a bright and clear B5 solution. Surprisingly, in the tests conducted with heated B100 as the blend component, the cold diesel did not quickly become bright and clear. The separate phase persisted for relatively long periods of time (minutes not fractions of minutes). Since residence times in truck rack piping are of the order of a few seconds, this persistence of separate phase indicates that the separate phase could enter a tank truck compartment. The mixing in the tank truck compartment is low to minimal intensity (e.g., wall, corner, valve regions). Thus the separate phase (particulates) could persist for periods of unknown duration in tank trucks. Particulates are well known to be problematic in fuel distribution systems.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept, spirit and scope of the invention. All such similar substitutes and modifications apparent to those skilled in the art are deemed to be within the spirit, scope and concept of the invention as defined by the appended claims.

The invention claimed is:

1. A method of providing a blend of biodiesel and diesel fuel in a cold temperature environment comprising blending a portion of the diesel fuel with 100% biodiesel to achieve a first blend of 50% or less biodiesel, wherein the diesel and biodiesel are heated to a temperature such that the temperature of the first blend is above the Cloud Point for the first blend, and adding the first blend to unheated diesel fuel to provide a second biodiesel blend.

2. The method of claim 1, wherein the 100% biodiesel is held in a heated tank prior to mixing with the heated diesel, and wherein the temperature of the biodiesel in the heated tank is from 30° F. to 120° F.

3. The method of claim 1, wherein the 100% biodiesel in held in a heated tank, and wherein the temperature of the biodiesel in the heated tank is from 30° F. to 100° F.

4. The method of claim 1, wherein the 100% biodiesel in held in a heated tank, and wherein the temperature of the biodiesel in the heated tank is from 40° F. to 80° F.

5. The method of claim 1, wherein the portion of diesel fuel added to the first blend is diverted from an unheated diesel stream into a conduit comprising an in-line heating system prior to mixing with the 100% biodiesel.

6. The method of claim 5, wherein the heated portion of diesel is heated to a temperature of from 5° F. to 120° F.

7. The method of claim 5, wherein the heated portion of diesel is heated to a temperature of from 10° F. to 120° F.

8. The method of claim 5, wherein the heated portion of diesel is heated to a temperature of from 30° F. to 100° F.

9. The method of claim 5, wherein the heated portion of diesel is heated to a temperature of from 40° F. to 70° F.

10. The method of claim 1, wherein the first blend is a B50 blend.

11. The method of claim 1, wherein the first blend is a B25 blend.

12. The method of claim 1, wherein the first blend is a B20 blend.

13. The method of claim 1, wherein the first blend is a B10 blend.

14. The method of claim 1, wherein the second blend is a B5 blend.

15. The method of claim 1, wherein the second blend is a B2 blend.

16. The method of claim 1, wherein the cold diesel is at a temperature below 20° F.

17. The method of claim 1, wherein the cold diesel is at a temperature of from 0° F. to 5° F.

18. The method of claim 1, wherein the second blend is moved through a conduit to a load arm for loading into a tank truck.

19. An in-line method of producing a bright and clear blend of biodiesel in which biodiesel is blended into diesel fuel that is below 20° F. comprising:
    providing a heated tank of 100% biodiesel and an unheated tank of diesel fuel;
    moving heated biodiesel through a first conduit from the heated tank to a first injection point;
    moving unheated diesel fuel through a second conduit to a second injection point;
    diverting a portion of the diesel fuel into a third conduit prior to the second injection point, wherein the third conduit comprises an in-line heater, wherein the third conduit joins the first conduit at the first injection point, and wherein a first blend is produced at the first injection point, and further wherein the first blend is at a temperature above the Cloud Point of the first blend; and
    moving the first blend through the first conduit to the second injection point such that the first blend is blended with the unheated diesel fuel to produce a bright and clear biodiesel blend.

20. The method of claim 19, wherein the first blend is from 5% to 90% biodiesel.

21. The method of claim 19, wherein the first blend is from 20% to 80% biodiesel.

22. The method of claim 19, wherein the first blend is from 25% to 75% biodiesel.

23. The method of claim 19, wherein the first blend is from 5% to 50% biodiesel.

* * * * *